United States Patent
Agnihotri et al.

(10) Patent No.: US 10,518,226 B2
(45) Date of Patent: Dec. 31, 2019

(54) MEMBRANES WITH POLYDOPAMINE COATINGS

(76) Inventors: Dileep Agnihotri, Round Rock, TX (US); Xiaofei Huang, Austin, TX (US); Hua Li, Austin, TX (US)

(*) Notice: Subject to any disclaimer, the term of this patent is extended or adjusted under 35 U.S.C. 154(b) by 1156 days.

(21) Appl. No.: 14/118,099

(22) PCT Filed: May 15, 2012

(86) PCT No.: PCT/US2012/037996
§ 371 (c)(1),
(2), (4) Date: Nov. 15, 2013

(87) PCT Pub. No.: WO2012/158717
PCT Pub. Date: Nov. 22, 2012

(65) Prior Publication Data
US 2014/0054221 A1    Feb. 27, 2014

Related U.S. Application Data

(60) Provisional application No. 61/486,561, filed on May 16, 2011.

(51) Int. Cl.
*B01D 71/60* (2006.01)
*B01D 67/00* (2006.01)
(Continued)

(52) U.S. Cl.
CPC ............ *B01D 71/60* (2013.01); *B01D 65/02* (2013.01); *B01D 67/0088* (2013.01); *B01D 71/06* (2013.01)

(58) Field of Classification Search
CPC ............ B01D 67/0088; B01D 67/0093; B01D 2323/02
See application file for complete search history.

(56) References Cited

U.S. PATENT DOCUMENTS 2,412,096 A * 12/1946 Odell .................... C10G 11/00
                                                                    208/132
2,546,238 A *  3/1951 Cadwallader ............ C08F 2/38
                                                                    526/229
(Continued)

FOREIGN PATENT DOCUMENTS

EP      0356208     2/1990
JP      04219109    8/1992
(Continued)

OTHER PUBLICATIONS

Wang et al., High flux electroneutral loose nanofiltration membranes based on rapid deposition of polydopamine/polyethyleneimine, 5 J. Mater.Chem. A 14847, 14848 (2017). (Year: 2017).*
(Continued)

*Primary Examiner* — Krishnan S Menon
*Assistant Examiner* — Brad Gordon

(57) ABSTRACT

A membrane with rejection properties for mono and divalent-salts, BOD and COD good resistance to cleaning chemicals and maintaining high permeability for water. A polymeric coating prepared from polydopamine or hydroquinone or catechol or mixtures thereof, is deposited. In another embodiment, coating process steps and conditions are taught to achieve thickness control to tune the rejection properties of the membranes.

12 Claims, 3 Drawing Sheets

(51) Int. Cl.
  *B01D 71/06*   (2006.01)
  *B01D 65/02*   (2006.01)

(56) References Cited

U.S. PATENT DOCUMENTS

| | | | | |
|---|---|---|---|---|
| 2,908,635 | A * | 10/1959 | Ogorzaly | B01J 21/12 208/120.01 |
| 3,476,668 | A * | 11/1969 | Kowarik Klaus | C09D 5/4473 204/492 |
| 4,060,488 | A * | 11/1977 | Hoover | B01D 67/0088 210/321.82 |
| 4,983,717 | A | 1/1991 | Yamasaki et al. | |
| 8,017,050 | B2 | 9/2011 | Freeman et al. | |
| 8,541,060 | B2 | 9/2013 | Messersmith et al. | |
| 2010/0051538 | A1 * | 3/2010 | Freeman | B01D 67/0093 210/500.33 |
| 2010/0059433 | A1 | 3/2010 | Freeman et al. | |
| 2012/0111791 | A1 | 5/2012 | Freeman et al. | |
| 2014/0221522 | A1 * | 8/2014 | Antoni | A61L 27/34 523/105 |

FOREIGN PATENT DOCUMENTS

| | | | |
|---|---|---|---|
| JP | 08168615 | 7/1996 | |
| KR | 20090133100 | 12/2009 | |
| WO | WO-0118125 A1 * | 3/2001 | ............ A61K 8/347 |
| WO | WO-2008049108 A1 * | 4/2008 | ............ C08J 7/123 |
| WO | 2011005258 | 1/2011 | |

OTHER PUBLICATIONS

International Search Report for PCT/US2012/037996, Completed by the Korean Patent Office dated Nov. 27, 2012, 5 Pages.
McCloskey et al. Polymer 2010, vol. 51, p. 3472-3485, "Influence of polydopamine deposition conditions on pure water flux and foulant adhesion resitance of reverse osmosis, ultrafiltration, and microfiltration membranes."
Xi et al. Journal of Membrane Science 2009, vol. 327, p. 244-253, "A facile method of surface modification for hydrophobic polymer membranes based on the adhesive of poly(DOPA) and poly(dopamine)."
Kim et al. ACS Applied Materials and Interfaces, Dated Dec. 31, 2012, 6 Pages. "Oxygen Concentration Control of Dopamine-Induced High Uniformity Surface Coating Chemistry."

* cited by examiner

MEMBRANES WITH POLYDOPAMINE COATINGS

CROSS-REFERENCE TO RELATED APPLICATION

This application is the U.S. national phase of PCT Application No PCT/US2012/037996 filed on May 15, 2012, which claims the benefit of U.S. Provisional Patent Application No. 61/486,561 filed May 16, 2011 the disclosures of which are incorporated in their entirety by reference herein.

STATEMENT OF FEDERALLY FUNDED RESEARCH

None.

TECHNICAL FIELD OF THE INVENTION

The present invention relates in general to the field of membranes for water and other effluent treatment and more particularly to the deposition of polymer on membrane surface to improve their salt rejection, chemical oxygen demand (COD) and biological oxygen demand (BOD) rejection as well as resistance to cleaning chemicals, and easier maintenance leading to improved life cycle. The membranes of specific interests include RO (reverse osmosis), nanofiltration (NF), ultrafiltration (UF) and microfiltration (MF).

BACKGROUND OF THE INVENTION

Without limiting the scope of the invention, its background is described in connection with membranes for water purification. The membranes are commonly used in purification of water whether it is surface water (rivers and lakes), or underground water (aquifers) or industrial and municipal wastewater (mining, metals, dyeing, chemical) or produced water from oil and gas extraction as well as desalination (brackish or seawater). Membranes are very efficient and energy friendly for water purification, however, they suffer from fouling.

Fouling occurs when certain impurities in water deposit on a membrane's surface or in its internal pore structure. This deposition leads to a dramatic reduction in permeate flux, requiring periodic chemical cleanings resulting in increased operating costs and decreased membrane life. New membrane materials and treatments are researched to help reduce foulant adhesion. Recently, very thin coatings of polydopamine, polydopamine+PEG [Freeman et al. U.S. Pat. No. 8,017,050 issued Sep. 13, 2011] and hydroquinone, catechol, or mixtures of hydroquinone, catechol, and/or polydopamine [Freeman et al. Non-provisional patent application Ser. No. 12/939,764] onto the surface of commercial microfiltration, ultrafiltration, nanofiltration, and reverse osmosis membranes have shown significant reduction in membrane fouling. A multi-year research program at the University of Texas resulted in filing of the above patents and patent applications beside a graduate thesis for Dr. Bryan McCloskey. Key finding of his research are published in a paper McCloskey et. al—"Influence of Polydopamine Deposition Conditions on Pure Water Flux and Foulant Adhesion Resistance of Reverse Osmosis, Ultrafiltration, and Microfiltration Membranes," *Polymer*, 51, 3472-3485 (2010). In addition, more work on the subject matter was pursued by Xi, Z. Y and published as "A facile method of surface modification for hydrophobic polymer membranes based on the adhesive behavior of poly(DOPA) and poly (dopamine)," Journal of Membrane Science (2009). Details for the above works are incorporated herein as reference. It was demonstrated in previous works that beside antifouling properties, these thin polymeric coatings are extremely hydrophilic and permeable to water, however, these works either did not develop or disclosed details related to -1) improvements in membrane selectivity for ion rejection and their implications; -2) capability to effectively utilize the active chemistry use during the coating of polydopamine layer; -3) its storage, repeated and more effective use and safe disposal; and -4) effective maintainability and serviceability of the coated membranes. Advanced Hydro Inc. undertook the commercialization of the technology of the issued patent U.S. Pat. No. 8,017,050 and through additional research developed claims embodied in this patent application.

Since membranes are engineered and highly optimized to remove specific material from the feed effluent, for example, total dissolved solids (TDS) in form of mono and divalent ions such as NaCl, $MgSO_4$, $CaSO_4$, or other high molecular weight materials such as sugars, chemicals, organic molecules and other macromolecules. An RO membrane is optimized to reject NaCl for effective desalination while an NF membrane is optimized to reject divalent ions; however, the rejection of NF membranes for monovalent ions is significantly less than that of typical RO membranes. Similarly, UF membranes are designed to reject higher molecular weight impurities and become completely permeable to mono and divalent ions. While optimizing a rejection threshold for ion size or molecular weight cut-off, other properties such as permeability and energy efficiency are usually sacrificed.

In addition, membranes also wear over time due to exposure to undesired chemicals during cleaning or accidental exposure to free chlorine in the case of RO and NF membranes. It is highly desirable to have membranes with improved resistance to cleaning chemicals and free chlorine exposures used for maintenance of filtration systems. As cleaning chemicals impact the membrane performance over long term, it is desired to minimize the use of cleaning chemicals.

In this invention, we present details regarding how to exploit polymeric coating's high permeability to water with optimized coating conditions to make membrane more selective for ion-rejection while maintaining their energy efficiency. In addition, we present details regarding the ease of maintenance of the membranes with minimum use of chemicals as well as process that makes them more resistant to cleaning chemicals while harvesting the benefits of improved antifouling properties.

SUMMARY OF THE INVENTION

The present invention provides improved membrane rejection properties for mono and divalent-salts, BOD and COD while also improving resistance to cleaning chemicals and maintaining higher permeability for water. The coating prepared from polydopamine or hydroquinone or catechol or mixtures thereof (termed as Polymeric Coating), is deposited using a base process from Freeman et al. U.S. Pat. No. 8,017,050 issued Sep. 13, 2011 and Freeman et al. in Non-provisional patent application Ser. No. 12/939,764.

In addition, unique coating process steps and conditions are taught to achieve desired functionality. One novel aspect of the process is thickness control via chemical concentration and coating time to tune the rejection properties of the membranes.

Another novel aspect of the coating process discloses removal of polymer particles during the polymerization process for effective utilization of the active chemistry (solution) thus reducing the coating cost. Another aspect of the coating process discloses the average lifespan of active solution for polymerization.

We also teach details of impact of presence of free Cl$^-$ and its impact on coated polymer layer. With these details, we teach how to use bleach to strip of a previously applied Polymeric coating and reapply a new coating. We also disclose that due to presence of thin polymeric coating, a sacrificial protection is provided to base membranes such as polyamide RO and NF membranes to protect them from accidental Cl exposure. We disclose the interaction details for free Chlorine and polydopamine layer based on contact angle measurements.

We also teach details of the process for safe disposal of the coating materials once their useful life has been exhausted.

We also teach use of hot-water based cleaning and regeneration process (HWC™) for membranes without using any chemical additives.

BRIEF DESCRIPTION OF THE DRAWINGS

A more complete and thorough understanding of the present embodiments and advantages thereof may be acquired by referring to the following description taken in conjunction with the accompanying drawings wherein.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of distinct ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

A membrane is a permeable, often porous material in the form of a film, a tube, a powder or a block and capable of filtering certain material while blocking others. The pores or thin layer of the membrane defines its unique characteristics for serving as a selective barrier. Membranes are widely used in purification of gases and liquids. They are highly energy efficient; however they generally require a pressure differential to work. Advanced purification of water today mostly uses membranes. Based on their pore size, membranes are classified as reverse osmosis (RO), nano-filtration (NF), ultra-filtration (UF) and micro-filtration (MF). While all of these membranes are permeable to water, they reject certain size impurities while allowing water to go through them.

Figure 1:
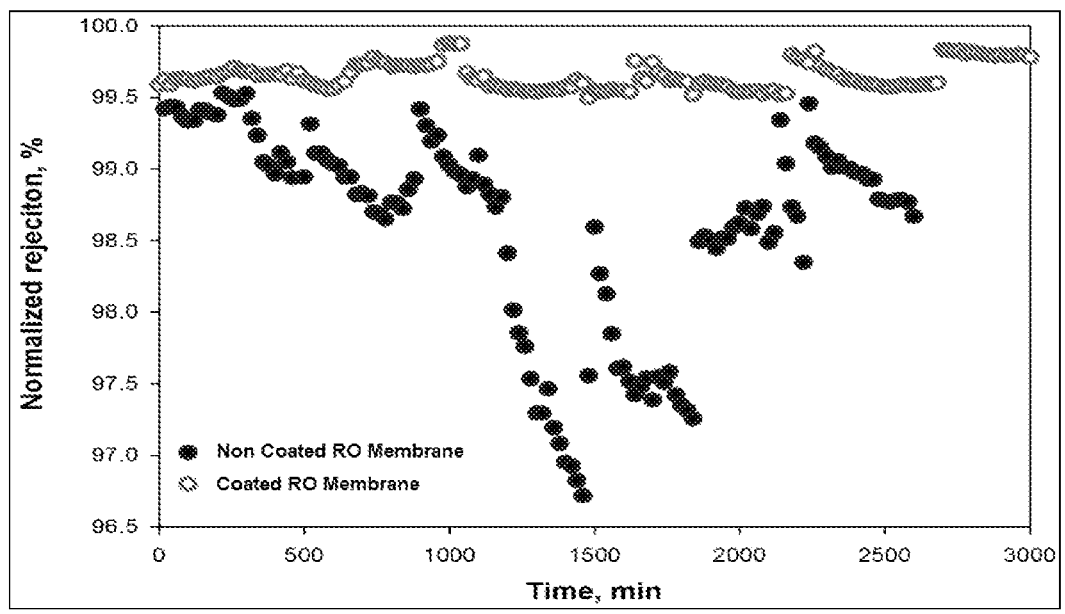
FIG. 1 illustrates comparison of NaCl rejection for an RO membrane with and without Polymeric coating during desalination of a high concentration (40,000 ppm) water stream according to an embodiment of the current disclosure.
Figure 2:
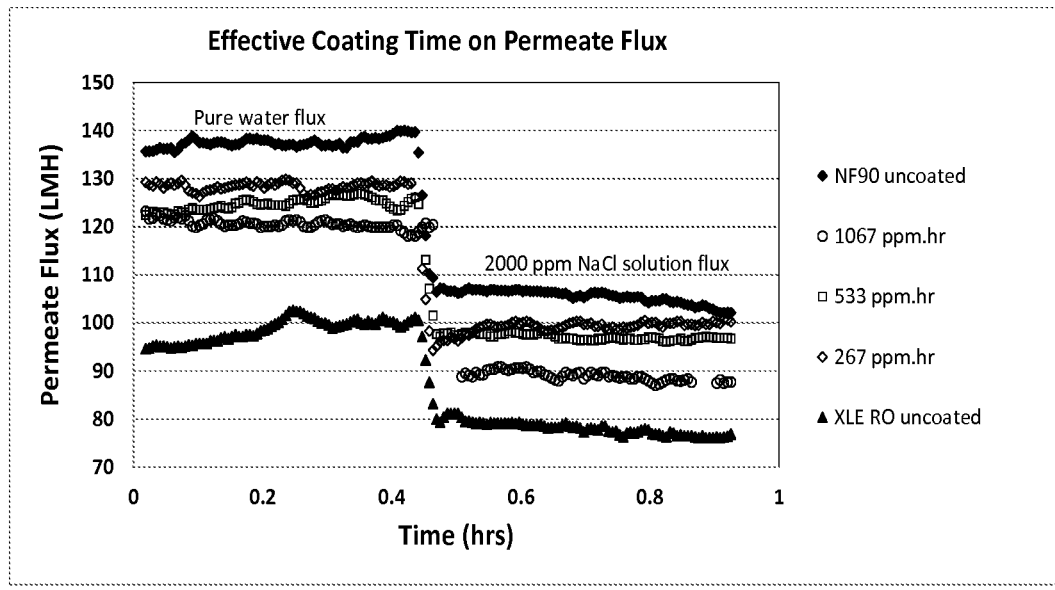
FIG. 2 illustrates typical permeability of clean water and 2000 ppm NaCl solution for an RO membrane (XLE from Dow), and a nano-filtration (NF) membrane (NF90 from Dow) and variation in NF membrane permeability due to presence of varying thickness of Polydopamine Polymeric coatings. This data demonstrates that using a combination of coating time and concentration of the active chemistry, we can tune a desired range for permeability and salt rejection properties of NF membranes by addition of Polymeric coatings according to embodiments of the current disclosure.
Figure 3:
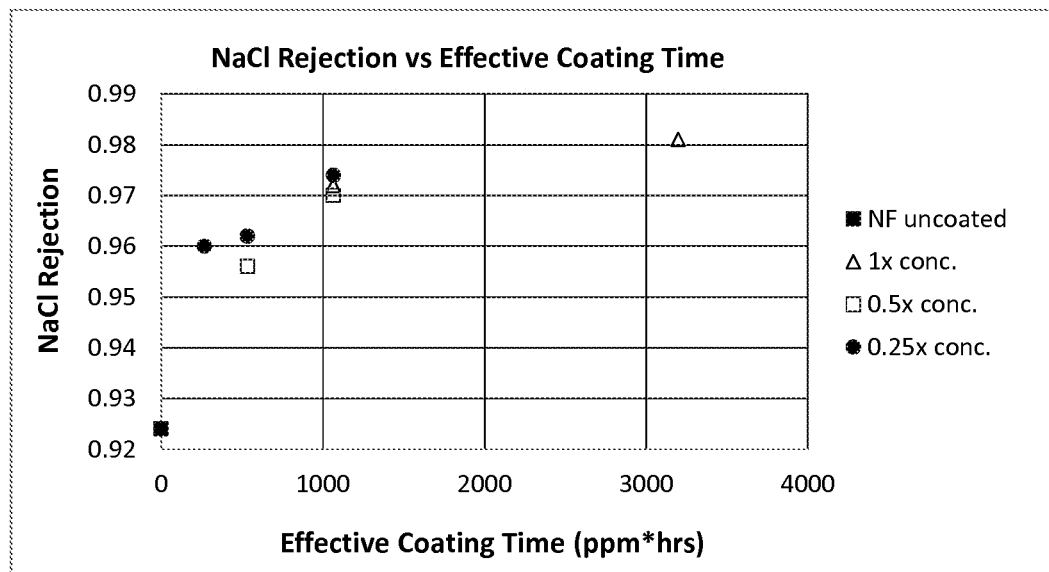
FIG. 3 illustrates typical NaCl rejection properties of NF 90 membrane as function of coating time and concentration of dopamine solution. This data demonstrates that using a combination of coating time and concentration of the active chemistry, we can tune a desired range for permeability and salt rejection properties of NF membranes by addition of Polymeric coatings according to embodiments of the current disclosure.
Figure 4:
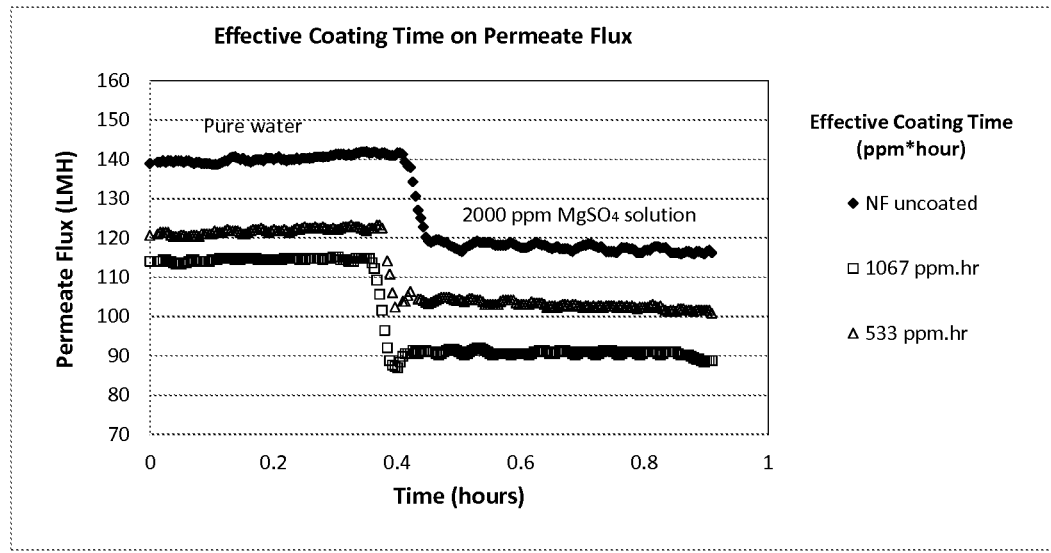
FIG. 4 illustrates typical permeability of clean water and 2000 ppm MgSO4 solution for a nano-filtration (NF) membrane (NF90 from Dow) and variation in NF membrane permeability due to presence of varying thickness of Polydopamine Polymeric coatings. This data demonstrates that using a combination of coating time and concentration of the active chemistry, we can tune a desired range for permeability for NF membranes by addition of Polymeric coatings according to embodiments of the current disclosure.
Figure 5:
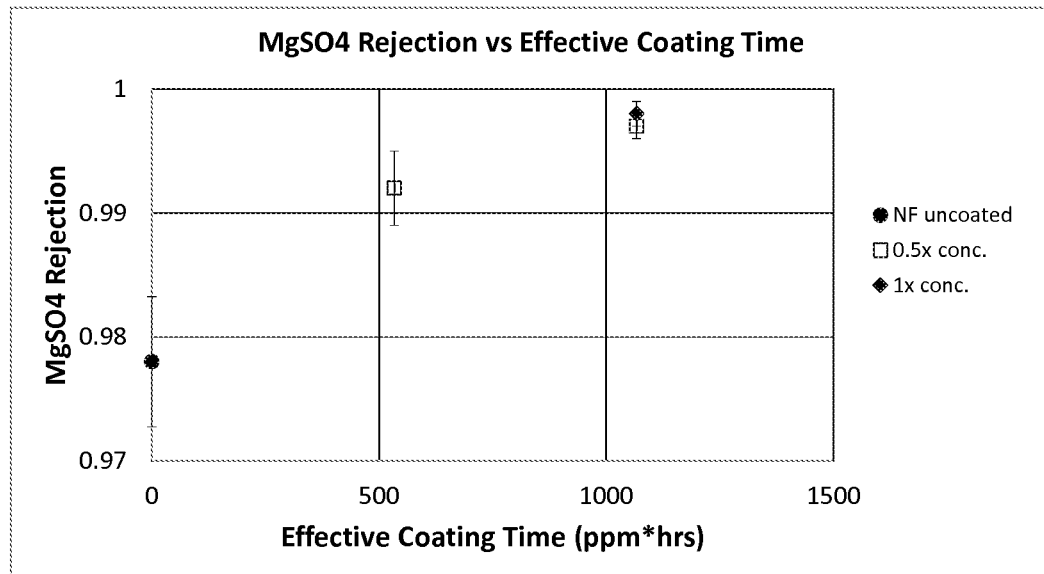
FIG. 5 illustrates typical MgSO4 rejection properties of NF 90 membrane as function of coating time and concentration of dopamine solution. This data demonstrates that using a combination of coating time and concentration of the active chemistry, we can tune a desired range for permeability and salt rejection properties of NF membranes by addition of Polymeric coatings according to embodiments of the current disclosure.

An RO membrane is designed to rejects material as small as ions like Na$^+$ and Cl$^-$ thus enabling desalination of water. Typically, they are capable of rejecting more than 99% of the monovalent and divalent ions such as Na$^+$, Cl$^-$, Ca$^{++}$, Mg$^{++}$ and SO$_4^-$. Most RO membranes require pressure to filter water through them. This pressure requirement is directly related to the amount of salt concentrations (or total dissolved solids, TDS) for the water processed. Higher TDS requires higher feed pressure to overcome the osmotic pressure. Higher pressure means increased energy use by pumps to permeate water through RO membranes. Today, for seawater desalination, energy is a significant cost component and can be as high as 30% of the total cost to desalinate water. Seawater usually has TDS in the range of 3-4%, brackish water (underground) TDS can vary in the range 0.5-2% while surface water (rivers and lakes) TDS can be lower, in the range of 0.1-1%. For drinking purposes, TDS of less than 0.05% (500 ppm) is required and lower is always better. In one embodiment of the invention, we disclose improved salt rejection capability of RO membranes with Polymeric Coating. FIG. 1 shows performance of coated vs. non-coated seawater RO membranes. Using a thin polymeric coating of polydopamine on RO membranes, we demonstrated that RO membranes with polydopamine coating have significantly higher normalized NaCl rejection. We further developed such correlation for NF membranes resulting in additional embodiment of the invention. FIG. 2 through 5 show a range of data providing a tunable rejection for NF membranes with dopamine solution and coating time as control variables. The resulting membranes can have an optimized rejection and permeability starting with base membranes such as NF90. However, we discuss data here in context to NF90, we anticipate similar results for membranes with larger variations from Ultrafiltration to very tight NF membranes.

For desalination, it is necessary to optimize applied pressure for maximum permeate efficiency (ratio of permeate and feed). For seawater desalination, typical feed pressures can range from 600 to 1000 psi while achieving permeate efficiency in the range of 40-45%. For brackish water, the feed pressures typically range from 200 to 400 psi while achieving permeate efficiency in the range of 55-65%. Surface water desalination typically requires feed pressures in range of 100-200 psi and is able to achieve 65-80% efficiency. While rejecting TDS, RO membranes may also reject other harmful impurities such as Arsenic, Boron and other heavy metals. In another embodiment of the invention, we disclose improved rejection of harmful impurities such as Arsenic, Boron and other heavy metals by membrane with added Polymeric Coating.

Due to extremely high TDS, produced water in oil and gas industry is very challenging water for desalination. Shale-gas wells require large amounts of water for "fracking" that eventually flows back and has a broad salinity (TDS) range of 3-10%. To desalinate water above 4% TDS using RO membranes, enormous feed pressures are required to overcome osmotic pressure, and RO membranes quickly lose permeate as well as energy efficiency. For such applications, NF membranes can be utilized as a two stage system so both energy and permeate efficiencies can be optimized. However, such approaches have been tried in past using standard membranes such as NF50 and NF90, by adding Polymeric coating to the NF membranes, we are able to further tune permeability and rejection of a two stage system so the overall improved energy and productivity is achieved. In another embodiment of the invention, we disclose use of NF membranes in a two stage NF/NF or NF/RO system with optimized energy and permeate efficiencies while simultaneously improving overall salt rejection with Polymeric Coating.

Low TDS water such as surface water also frequently uses NF membranes to remove salts, minerals and other impurities. NF membranes are more permeable than RO membranes. However, permeability improvements (directly relate to energy efficiency) come at the cost of reduced rejection for salts (for example ~90% for NaCl, 96% for $MgSO_4$) and other impurities such as Arsenic and heavy metals. As demonstrated in FIGS. 2-5, tunable improvements are possible with Polydopamine coatings in regards to improving rejections while pursuing high productivity. In another embodiment of the invention, we disclose NF membranes with improved rejection capabilities for salts and other impurities while maintaining high energy and permeate efficiencies.

RO membranes are also used in processing wastewater from Beverage (sugars), Paper (organic) and Chemical (large molecules) industries. There are requirements for this water to meet certain BOD and COD limits before discharge. To meet such requirements, operators may often implement multiple stage systems where the first stage will usually reject most of the BOD and COD while not reaching permit requirements. The water would then be processed using a polisher (second stage) to further reduced BOD/COD to meet discharge requirements. In a detailed experiment, we demonstrated that standard RO membranes can have improved BOD/COD rejection properties by addition of thin polydopamine polymeric coatings. This can allow elimination of a second polishing stage usually required for meeting BOD/COD limits in water treatment plants. In one embodiment of the invention, we disclose RO and NF membranes with improved rejection capabilities for BOD and COD while processing sugars, organic and large-molecule impurities in wastewater.

Similar to RO membranes, UF membranes are optimized for larger molecular weight impurities. For example, in the pharmaceutical industry, very specific molecular weight cut-off limits are required to separate mixtures of effluent with multiple molecular weight impurities. The term "UF" is generally used for filtration of molecules size ranging from 50 to 150,000 Daltons. Membranes with specific lower-cut off windows are designed and manufacturers always face challenge to have highly optimized cut-off. With addition of thin polymeric polydopamine coating, with a variable/tunable coating thickness (concentration×time), we anticipate to narrow the pore size distribution of the UF membranes. However, the overall loss in permeability is expected to be minimum since polymeric coating add to the hydrophilicity of the membranes resulting in improved cut-off without much change in permeability. In one embodiment of the invention, we disclose additional optimization of UF membranes to achieve tighter cut-off limits using Polymeric Coating.

MF membranes are commonly used as a pre-filtration step for desalination or treatment of surface water requiring removal of certain suspended solids as well as bacteria and viruses. These membranes can also be further improved without sacrificing their high permeability by applying a Polymeric Coating as disclosed herein. In one embodiment of the invention, we disclose additional improvements of MF membranes resulting in increased rejection of suspended solids.

Figure 6:
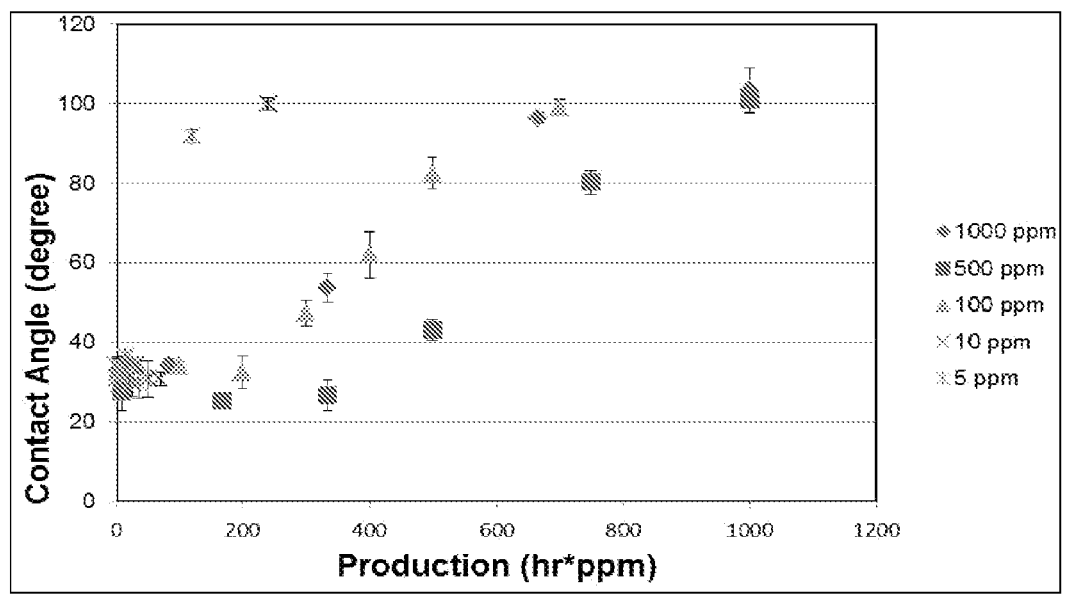
FIG. 6 illustrates how the contact angle of a coated PES (polyethersulfone) UF membrane changes during its interaction with bleach based cleaning solution of known free Chlorine concentration. The polymeric coating degrades and has a threshold of about 500 ppm.hr of exposure before breaching the barrier. This data correspond to embodiments of the current disclosure.

Fouling, a very common problem faced by membranes, occurs when certain impurities in water deposit on a membrane's surface or in its internal pore structure. This deposition leads to a dramatic reduction in water flux that increases operating costs and decreases membrane lifetime. To remove foulants and cake layers formed during filtration, membranes are frequently cleaned with chemicals having extreme pH ranges. Caustics such as NaOH, KOH are used to clean organic foulants while acids such as $H_2SO_4$ or Citric Acid are used to clean precipitating salts. Most membrane materials are designed to take a certain amount of exposure to these cleaning chemicals, however, over long periods of time, certain membranes, particularly RO/NF and some UF membranes will wear out due to chemical degradation resulting from attack of the membranes by the cleaning chemicals, resulting in poor rejection performance and ultimately requiring membrane replacement. Polyamide membranes can tolerate 500-1000 hours of (1% concentration) interaction with cleaning chemicals with high and low pH before showing signs of wear. In addition, they are extremely sensitive to free Chlorine and wear very quickly with only about 1000 ppm hours (or less) of exposure to free chlorine. FIG. 6 illustrates how the contact angle of a coated PES (polyethersulfone) UF membrane changes during its interaction with bleach based cleaning solution of known free Chlorine concentration. The polymeric coating degrades and has a threshold of about 500 ppm.hr of exposure before breaching the barrier. This data correspond to embodiments of the current disclosure. Based on this data, we project that polydopamine coating will provide a sacrificial barrier against free Chlorine for polyamide base NF and RO membranes. This mean an increased tolerance to accidental exposure of free Chlorine. In one embodiment of the invention, we disclose that due to presence of added Polymeric Coating, having a very similar chemical interaction property as polyamide membranes with cleaning chemicals, coating protects base membrane and extends membrane life. In another embodiment of the invention, we disclose that with Polymeric Coated RO membranes may be shielded for up to 1000 ppm hours of accidental Chlorine exposure. These improvements are achieved with little or minimum penalty for permeate efficiencies.

Since free Cl– is able to strip Polydopamine base polymeric coating, we are able to reach native membrane surface and apply a new coating after stripping a previously applied coating. In one embodiment discussed above and as shown in FIG. 6, we teach details of impact of presence of free Cl$^-$ and on coated polymer layer. With these details, we teach how to use bleach to strip of a previously applied Polymeric coating and reapply a new coating. This method has been used in field and reduced to practice for MF and UF membranes that are able to tolerate exposure to free Chlorine.

As disclosed above, in order to maintain membranes over long period of time, users, operators and facilities subject them to periodic cleaning using caustic (NaOH) and acid (Citric Acid) solution of high and low pH. In addition, free Chlorine is also used for membranes that are able to tolerate free Chlorine. Freeman et. al teaches that with antifouling properties due to Polydopamine and PEG adhesion, requirement for free-Chlorine can be minimized or completely eliminated. However, they fail to teach if there other effect processes that can replace use of Caustic and Acid. More commonly uses is seen as either once every 8-12 hours or daily soak and flush of the membranes with mild acidic and basic solutions and then every few weeks soak and flush of membranes with higher concentration acidic and basic solutions. In a long field trial for US-Navy, Advanced Hydro demonstrated a unique method using only hot-water soak and flush (HWC™) without any caustic or acids additives with water temperatures ranging 100-140 F worked very effectively and replaces the daily acid/caustic soak and flush requirements. This results from increased hydrophilicity of the membranes and HWC™ process is very effective in removing foulant cake from the membrane surface. This eliminates need for use of chemicals for more extended period. In one embodiment of the invention, we disclose use of daily HWC™ (hot-water clean) maintenance soak/flush/scour procedure for regeneration of membranes without any chemical additives thus allowing for membrane operation over extended period without use of chemicals.

The base deposition process for Polymeric Coating as disclosed by Freeman et al. in U.S. Pat. No. 8,017,050 issued Sep. 13, 2011 and Freeman et al. in Non-provisional patent application Ser. No. 12/939,764 teaches how fouling is reduced by improving hydrophilicity of the membrane surface. However, it does not address commercialization issues such as: 1) efficacy of coating process as a function of time and concentration and its impact on membrane rejection properties; 2) how long the coating solution is active and useable and any process optimization to minimize costs; 3) and, finally, how to safely dispose of the coating solution once it is utilized. In one embodiment of the invention, we disclose optimization of coating time and concentration to tune desired membrane properties including optimized rejection properties, energy use and permeate efficiency. In another embodiment of the invention, we disclose specific steps to use coating solution for multiple membranes to minimize costs. In another embodiment of the invention, we disclose how long coating solution remains active for Polymeric Coating. In another embodiment of the invention, we disclose how to safely dispose consumed coating solution.

In the table below, we present results of our coating for rejection and flux properties on on three sets of membranes; the first one is an XLE-RO membrane from Dow, and the second and third are NF90 membranes from Dow. One of the NF90 membranes was coated with varying thicknesses of polydopamine. With coating, we increase monovalent salt rejection of the NF90 membrane from 92 to 98% and simultaneously achieve divalent salt rejection of greater than 99%. Comparing with the extra low-energy RO membrane, we are able to achieve about 30% higher flux for same feed pressure, similar divalent salt rejection and nearly 98% NaCl rejection. This allows for increased efficiency (reduced energy and increased flux) desalination.

| Membrane | Pure Water (LMH) | 2000 ppm NaCl (LMH) | % NaCl Rejection | % MgSO$_4$ Rejection |
|---|---|---|---|---|
| RO (Non Coated) | 90-100 | 60-70 | >99% | >99% |
| NF90 (Non Coated) | 130-140 | 105-110 | 92% | 96% |
| NF90 (coated) | 115-125 | 85-100 | 96-98% | >99% |

In one embodiment of the invention, we claim NF membranes having more than 20% higher flux compared to extra low-energy RO membranes while achieving >98% monovalent ion rejection and >99% divalent ion rejection thus enabling reduced energy and increased efficiency desalination.

During the coating process, active agents such as dopamine, hydroquinone, catechol or a mixture of these go through a self-polymerization process. Very small particles of brown color form during polymerization. These particles provide additional surface area for further self-polymerization, resulting in growth of particles during the polymerization/coating process. The resulting coating solution becomes brown, and suspended particles become visible to the eye. We anticipate that the surface area of these suspended particles competes with the surface we attempt to coat. In addition, these particles are expected to consume the active reagent from the solution. To use our active solution for coating of multiple membranes, we remove the suspended particles using 0.1-5 μm disposable filters at fixed interval of time. The subsequent solution is further used for coating of additional membranes. There is also a certain period during which the entire active solution will fully polymerize, resulting in a solution that is not capable of coating. In one embodiment of the invention, we disclose the process of particle removal to recycle the active solution. In another embodiment of the invention, we disclose addition of fresh salts in the active solution to extend the life of the active solution for additional coatings.

For an effective coating process, addition of oxygen is quite important. It is, in fact, required for the polymerization process. We disclose continuous bubbling of air or oxygen in the active solution or addition of fresh air into active solution during the coating process. In one embodiment of the invention, we disclose the need for such air/oxygen. In another embodiment of the invention, we claim use of air/oxygen bubbling to fully polymerize the solution to prepare it for disposal.

To safely dispose of the spent coating solution, it is highly desirable to not have any active chemicals in the used coating solution. In order to achieve this, we store the solution for a period of 24 hour and bubble oxygen/air to fully polymerize the active ingredients. The polymer particles are then filtered out using disposable MF/UF filter and the remaining solution is pH adjusted and further oxidized with bleach before being discharged as wastewater. In one embodiment of the invention, we disclose the process details for safe disposal of coating solution.

The support membrane used for modification may include one or more of the following: polymethylmethacrylates, polystyrenes, polycarbonates, polyimides, epoxy resins, cyclic olefin copolymers, cyclic olefin polymers, acrylate polymers, polyethylene teraphthalate, polyphenylene vinylene, polyether ether ketone, poly(N-vinylcarbazole), acrylonitrile-styrene copolymer, or polyetherimide poly (phenylenevinylene), polysulfones, sulfonated polysulfones, copolymers of styrene and acrylonitrile poly(arylene oxide), polycarbonate, cellulose acetate, piperazine-containing polymers, polyelectrolytes, poly(styrenes), styrene-containing copolymers, acrylonitrilestyrene copolymers, styrene-butadiene copolymers, styrene-vinylbenzylhalide copolymers; polycarbonates; cellulosic polymers, cellulose acetate-butyrate, cellulose propionate, ethyl cellulose, methyl cellulose, nitrocellulose, polyamides, polyimides, aryl polyamides, aryl polyimides, polyethers, poly(arylene oxides), poly(phenylene oxide), poly(xylene oxide); poly (esteramide-diisocyanate), polyurethanes, polyesters (including polyarylates), poly(ethylene terephthalate), poly (alkyl methacrylates), poly(acrylates), poly(phenylene terephthalate), polysulfides, poly(ethylene), poly(propylene), poly(butene-1), poly(4-methyl pentene-1), polyvinyls, poly(vinyl chloride), poly(vinyl fluoride), poly(vinylidene chloride), poly(vinylidene fluoride), poly(vinyl alcohol), poly(vinyl esters), poly(vinyl acetate), poly(vinyl propionate), poly(vinyl pyridines), poly(vinyl pyrrolidones), poly (vinyl ethers), poly(vinyl ketones), poly(vinyl aldehydes), poly(vinyl formal), poly(vinyl butyral), poly(vinyl amides), poly(vinyl amines), poly(vinyl urethanes), poly(vinyl ureas), poly(vinyl phosphates), poly(vinyl sulfates), polyallyls; poly(benzobenzimidazole), polyhydrazides, polyoxadiazoles, polytriazoles, poly(benzimidazole), polycarbodiimides, polyphosphazines and combinations thereof.

The membrane being modified may be in part or entirely made of one or more polymers. For example, the polymer surface may include Polyethylene (PE); Polypropylene (PP); Polystyrene (PS); Polyethylene terephthalate (PET or PETE); Polyamide (PA); Polysulfone; Sulfonated polysulfone or any other polyelectrolyte that is suitable for membrane use; Polyester Polyvinyl chloride (PVC); Polycarbonate (PC); Acrylonitrile butadiene styrene (ABS); Polyvinylidene chloride (PVDC); Polytetrafluoroethylene (PTFE); Polymethyl methacrylate (PMMA); Polylactic acid (PLA), Polypiperazine, and combinations thereof. In addition, the Polyethylene (PE); Polypropylene (PP); Polystyrene (PS); Polyethylene terephthalate (PET or PETE); Polyamide (PA); Polyester Polyvinyl chloride (PVC); Polycarbonate (PC); Acrylonitrile butadiene styrene (ABS); Polyvinylidene chloride (PVDC); Polytetrafluoroethylene (PTFE); Polymethyl methacrylate (PMMA); Polylactic acid (PLA) may be modified, substituted or altered by the skilled artisan.

What is claimed is:

1. A method of improving membrane rejection properties by depositing a coating on one or more membranes, the method comprising:
   (i) preparing a coating solution comprising one or more active agents, wherein said one or more active agents are polydopamine, hydroquinone, catechol, or a mixture thereof;
   (ii) preparing a coated membrane by circulation of the coating solution through a membrane for a given duration of time while bubbling air or oxygen into the coating solution;
   (iii) after completing step (ii), removing polymer particles formed in the coating solution using a 0.1-5 µm pore size filter to prepare a filtered coating solution;
   (iv) reusing the filtered coating solution from step (iii) for a new set of membranes; and
   (v) disposing of residual coating solution by
      (a) storing the coating solution in a tank;
      (b) bubbling oxygen or air through the tank for a period of 12-48 hrs to fully polymerize the one or more active agents;
      (c) removing polymer particles from the coating solution; and
      (d) adjusting the pH of the coating solution to neutral pH and adding 50-100 ppm bleach to oxidize any residual active agent;
   wherein the pH of the coating solution is changed from basic to acidic between steps (iii) and (iv) to temporarily stop polymerization and preserve the coating solution.

2. The method of claim 1, wherein the one or more membranes comprises an RO membrane, a UF membrane, an NF membrane, an MF membrane, or a combination thereof.

3. The method of claim 1, wherein the % rejection improvements of one or more of the membranes after coating are between 0.5% and 200%.

4. The method of claim 1, wherein the % loss of permeate flux of one or more of the membranes due to the coating process as described in claim 1 is between 0% and 50%.

5. The method of claim 1, wherein the coated membranes as described in claim 1 have higher resistance to damage from cleaning chemicals and exposure to free chlorine.

6. The method of claim 1, wherein coated Nanofiltration (NF) membranes after coating as described in claim 1 have greater than 96% rejection for monovalent ions and greater than 99% rejection for divalent ions.

7. The method of claim 1, wherein coated Nanofiltration (NF) membranes after coating as described in claim 1 have more than 10% higher flux compared to extra low-energy (XLE) RO membranes while achieving >98% monovalent ion rejection and >99% divalent ion rejection.

8. The method of claim 1, wherein the coated membrane as described in claim 1 comprises one or more of the following polymethyhnethacrylates, polystyrenes, polycarbonates, polyimides, epoxy resins, cyclic olefin copolymers, cyclic olefin polymers, acrylate polymers, polyethylene teraphthalate, polyphenylene vinylene, polyether ether ketone, poly(N-vinylcarbazole), acrylonitrile-styrene copolymer, or polyetherimide poly(phenylenevinylene)polysulfone, copolymer of styrene and acrylonitrile poly(arylene oxide), polycarbonate, cellulose acetate, polysulfones; poly(styrenes), styrene-containing copolymers, acrylonitrilestyrene copolymers, styrene-butadiene copolymers, styrene-vinylbenzylhalide copolymers;

polycarbonates;

cellulosic polymers, cellulose acetate-butyrate, cellulose propionate, ethyl cellulose, methyl cellulose, nitrocellulose, polyamides, polyimides, aryl polyamides, aryl polyimides, polyethers, poly(arylene oxides), poly(phenylene oxide), poly(xylene oxide);

poly(esteramide-diisocyanate), polyurethanes, polyesters (including polyarylates), poly(ethylene terephthalate), poly(alkyl methacrylates), poly(acrylates), poly (phenylene terephthalate), polysulfides, poly(ethylene), poly(propylene), poly(butene-1), poly(4-methyl pentene-1), polyvinyls, poly(vinyl chloride), poly(vinyl fluoride), poly(vinylidene chloride), poly(vinylidene fluoride), poly(vinyl alcohol), poly(vinyl esters), poly(vinyl acetate), poly(vinyl propionate), poly(vinyl pyridines), poly(vinyl pyrrolidones), poly(vinyl ethers), poly(vinyl ketones), poly(vinyl aldehydes), poly(vinyl formal), poly(vinyl butyral), poly(vinyl amides), poly(vinyl amines), poly(inyl urethanes), poly(vinyl ureas), poly(vinyl phosphates), poly(vinyl sulfates), polyallyls;

poly(benzobe117imidazole), polyhydrazides, polyoxadiazoles, polytriazoles, poly(benzimidazole), polycarbodiimides, polyphosphazines and combinations thereof.

9. The method of claim 1, wherein additional dopamine, hydroquinone, catechol, or a mixture of any these is added between steps (iii) and (iv) to maintain a concentration of the one or more active agents.

10. The method of claim 1, wherein a coated membrane as described in claim 1 is a flatsheet, or a hollow-fiber, or a porous block, or a rolled flatsheet with spacers.

11. The method of claim 1, wherein for a porous membrane of claim 1, only during the first 5-10 minutes of circulation in step (ii) a permeation is allowed through the porous membrane using pressure from a circulation pump or a height difference between a permeate port of the porous membrane and to allow penetration of the coating solution to a permeate side of the porous membrane.

12. A method of claim 1, wherein a coated membrane as described in claim 1 has a higher rejection rate for salts and other impurities such as BOD, COD and harmful materials such as Boron and Arsenic than an uncoated membrane.

* * * * *